United States Patent [19]

MacLeod

[11] 4,121,608
[45] Oct. 24, 1978

[54] LIQUID METERING DEVICE

[76] Inventor: Edward MacLeod, 143 Park Dr., Apt. 26, Boston, Mass. 02215

[21] Appl. No.: 768,401

[22] Filed: Feb. 14, 1977

[51] Int. Cl.² .............................................. A01G 27/00
[52] U.S. Cl. .......................................... 137/78; 47/79; 251/7
[58] Field of Search ................... 239/63, 64; 73/73; 137/78; 47/79; 251/4, 7; 61/13

[56] References Cited

U.S. PATENT DOCUMENTS

| | | | |
|---|---|---|---|
| 3,273,849 | 9/1966 | Hansson | 137/78 X |
| 3,426,539 | 2/1969 | Whear | 61/13 |
| 3,874,590 | 4/1975 | Gibson | 239/63 |
| 3,998,364 | 12/1976 | Hollander | 251/7 X |

*Primary Examiner*—Martin P. Schwadron
*Assistant Examiner*—Richard Gerard

*Attorney, Agent, or Firm*—Morse, Altman, Oates & Bello

[57] ABSTRACT

A moisture responsive liquid metering device is provided for use in controlling the amount of liquid delivered to a given location according to the moisture level at that location. The device includes a flexible tube through which the liquid flows from one location to another as from a container of water to a potted plant. In its preferred form, a valving device comprised of a wooden tubular sleeve and an elongated valve core are provided for opening and closing the tube in a squeezing action. The valve core is provided with an opening at one end through which the tube is threaded in close proximity to one end of the wooden sleeve which is substantially coextensive with the core. The device is planted in soil, for example, and when the soil is damp, the moisture causes the wooden sleeve to expand to pinch the tubing shut. As the soil dries out the sleeve contracts, releasing pressure on the tube and allowing water to flow.

5 Claims, 8 Drawing Figures

LIQUID METERING DEVICE

BACKGROUND OF THE INVENTION

1. Field of the Invention

This invention relates generally to liquid metering devices and more particularly is directed towards a novel liquid metering device of low cost, simple construction and responsive to the moisture demands at the point of delivery of the liquid.

2. Description of the Prior Art

There exists a need for automatically watering plants so that they may be left unattended for long periods of time. While double hulled pots have been provided in which the soil and plant are in the upper part of the pot while water is contained in the lower part and fed to the soil by wicking action, such pots are relatively expensive and heavy as well as being rather large. Further, such pots tend to add excessive moisture to the soil, which may not be desirable for all types of plants. Also, the amount of water that may be stored in pots of this type is relatively small and the reservoir is not visible so that one would not know the amount of water remaining in the reservoir.

Accordingly, it is an object of the present invention to provide means for automatically metering a liquid, such as water, from one location, such as a water tank, to another location such as a plant pot according to the moisture requirements at the other location.

Another object of this invention is to provide a low cost, simple water metering device for potted plants whereby plants may be left unattended for long periods of time and yet receive water as required.

SUMMARY OF THE INVENTION

This invention features a water metering device for plants, or the like, comprising a flexible tube, one end of which may be connected to a supply of water and the other end of which may be located in proximity to the plant and a moisture responsive valving device connected to the tube and adapted to open and close the tube according to the moisture demand in the soil surrounding the plant. The valving device includes an outer tubular sleeve of a material such as wood, which expands and contracts in response to moisture absorbed therein. A core of a material which is substantially inert to moisture extends through the sleeve and is formed with a transverse opening at one end through which the tube is threaded. The core opening is close to one end of the sleeve while the opposite end of the core and sleeve are connected. If the device is planted in the soil with its upper end exposed, the sleeve will expand to pinch the tube closed or contract to open the tube according to the moisture content in the soil, thereby metering the water to the soil as required.

DETAILED DESCRIPTION OF THE PREFERRED EMBODIMENT

Figure 1:
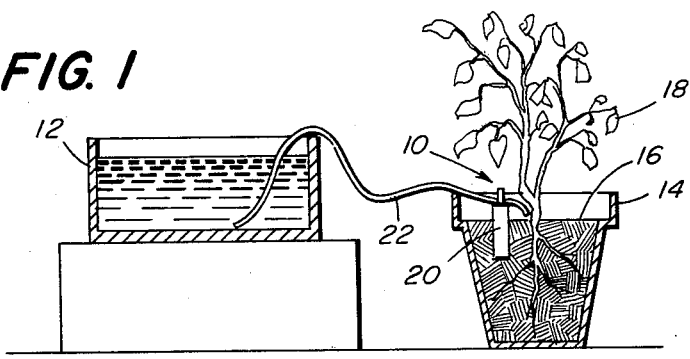
FIG. 1 is a sectional view in side elevation showing typical use of the metering device.

Referring now to the drawings and to FIG. 1 in particular, the reference character 10 generally indicates a liquid metering device which, in the illustrated embodiment, is employed to meter water on demand from a water source such as a tank 12 to a pot 14 containing soil 16 and a plant 18. The device 10 includes a moisture responsive valve 20, the lower portion of which is planted in the soil 16 and a flexible tube 22 extending from the water tank 12 through the valve 20 with the end preferably in close proximity to the plant 18.

The level of the water in the tank 12 should be above the discharge end of the tubing, and while a tank of water 12 is shown, the water may be stored by other means, such as a plastic bag, for example, which may be suspended from a wall or the like and connected to the tubing 22. The tubing should have a length sufficient to extend from the water supply to the plant and, in practice, may be of a flexible plastic material. For most applications, the tubing may be quite small in diameter and 1/16 inch O.D. tubing has been found satisfactory for watering typical house plants.

The valving device 20, in the illustrated embodiment, is comprised of an elongated outer tubular sleeve 24 having a relatively large coefficient of expansion in the presence of water so that the length of the sleeve will increase as the sleeve becomes moist and decrease when the sleeve becomes dry. For this purpose, wood has been found to be particularly satisfactory and, in practice, a relatively soft wood, such as pine, for example, may be used to advantage. The sleeve need not be particularly large and a length of perhaps 2 inches will provide sufficient dimensional changes to provide the desired metering action. The sleeve may be cylindrical or square in cross-section with transverse dimensions of perhaps ¼ inch to ½ inch. The sleeve is formed with a longitudinal passage or bore 26 of perhaps ⅛ inch in diameter and in which is mounted a valve core 28. The valve core 28 extends the full length of the sleeve with the lower end formed with a head 30 seated against a washer 32 engaging the lower end of the sleeve. The upper end of the core 28 extends beyond the upper end of the sleeve passing through a washer 34. Near the upper end of the valve core 28 there is formed a transverse opening 36 through which the tubing 22 is threaded. The opening 36 is of a diameter substantially corresponding to the outside diameter of the tubing 22 and is located close to the upper end of the sleeve. The core 28 is formed of a material which is dimensionally stable in the presence of water and for this purpose a plastic material such as nylon or PVC, or metal such as aluminum, brass, or the like, would be satisfactory.

Figure 3:
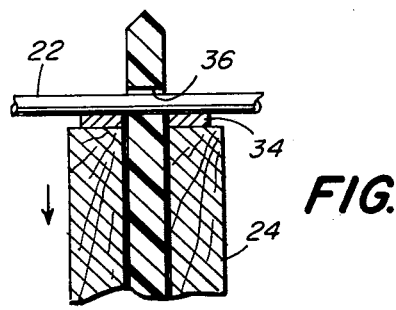
FIG. 3 is a detail view, similar to FIG. 2, but showing the device in the open position.
Figure 2:
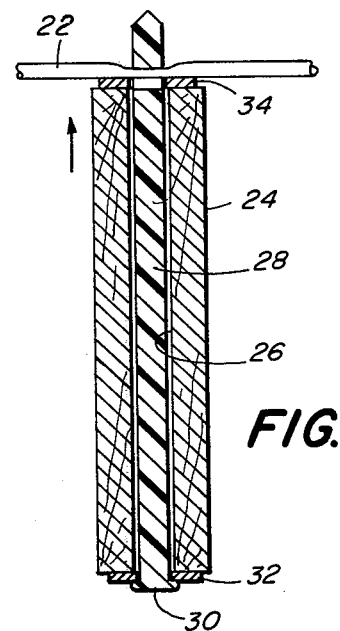
FIG. 2 is a sectional view in side elevation of the device showing the device in a closed position.
Figure 4:
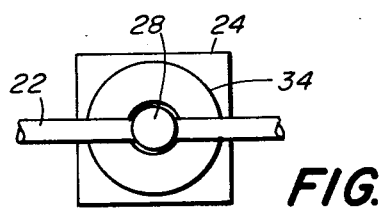
FIG. 4 is a top plan view of the device.
Figure 5:
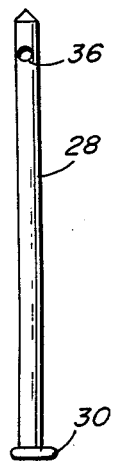
FIG. 5 is a view in side elevation of the valve core.
Figure 6:
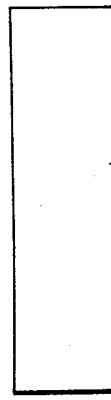
FIG. 6 is a view in side elevation of the sleeve.
Figure 7:
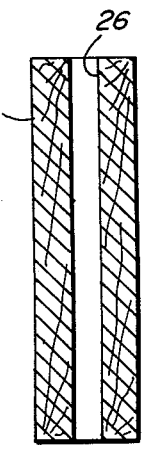
FIG. 7 is a sectional view in side elevation of the sleeve, and, FIG. 8 is a top plan view of the sleeve.
Figure 8:
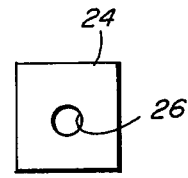

Insofar as the wooden sleeve 24 expands in the presence of water there will be a longitudinal movement between the core and the sleeve, depending upon the moisture condition of the soil 16 in which the device is planted. The position of the opening 36 in the valve core is selected so that when the sleeve is dry the lower edge of the hole 36 will be substantially even with the upper surface of the washer 34, where a washer is used. If there is no washer 34 then the lower edge of the hole 36 should be even with the upper end of the sleeve 24. This condition is shown in FIG. 3 and the tube 22 passes through the opening 36 unimpeded so that water is free to flow through the tubing. Thus, with the device planted in the manner shown in FIG. 1 and the soil dry, the sleeve likewise will be dry and the sleeve 24 will be in its shortened condition with the opening 36 clear of the end of the sleeve. Water will pass from the tank 12 to the plant in a syphoning action or in a draining action if the water is stored in a bag suspended above the plant. In any event, the water will pass through the tubing 22 into the soil 16. As the soil becomes moist from the water being metered through the tube, the sleeve 24 will absorb water and expand longitudinally. As the sleeve expands it will pinch the tubing 22 on either side of the opening 36 in the manner shown in FIG. 2, thereby cutting off the flow of water insofar as the valve core 28 will not change in length. The tube will remain pinched until the soil in the pot dries out. As the soil dries, the wooden sleeve also dries and in the process will shrink longitudinally. This will relieve the nipping pressure on the tubing, allowing water to again flow until the sleeve again becomes moist, expands and again cuts off the water. Thus, the device will meter water slowly and carefully to the plant, shutting off the water supply once the soil becomes moist.

The flow rate of the water may also be further controlled by implanting the sleeve to different depths in the soil. The deeper that the sleeve is planted, the greater will be the effect of moisture on the operation of the device. Similarly, if the device is planted only partially into the soil then the moisture effect on the sleeve will be reduced.

While the device 10, as shown, is metering water to one plant from the tank 12, obviously a single tank 12 may provide the water supply for a number of plants, each provided with a device 10. Also, while wood has been described as the preferred sleeve material, there are other natural and artificial materials that expand and contract in the presence of moisture and may be used to advantage.

While the invention has been described with particular reference to the illustrated embodiment, numerous modifications thereto will appear to those skilled in the art. For example, while the device has been shown in which the expansion element is the outer sleeve and the fixed element is the inner core, the parts could be reversed so that the core is made of wood, for example, and adapted to expand and contract. In such a case the sleeve should be formed with a diametrical passage in registration with the opening 36 in the core in order to pinch the tubing extending therethrough as the core expands. Numerous other modifications will appear to those skilled in the art.

Having thus described the invention, what I claim and desire to obtain by Letters Patent of the United States is:

1. A device for delivering a liquid such as water from a source to a site such as a potted plant, comprising
   (a) a valve adapted to be positioned at said site and responsive to the moisture level thereof,
   (b) said valve including a first member formed of a material having a relatively high coefficient of expansion in the presence of moisture and a second member formed of a material that is essentially stable in the presence of moisture,
   (c) said members being operatively connected to one another and defining a nipping joint therebetween subject to the relative movement between said members according to the moisture level at said site, and
   (d) an elongated flexible tube passing through said joint and adapted to be extended between said site and said source.
   (e) said first member being an elongated tubular sleeve and said second member being an elongated core restrained at one end to one end of said sleeve and said other end being formed with a transverse opening adjacent the other end of said sleeve, said tube passing through said opening.

2. A device, according to claim 1 wherein said sleeve is wood.

3. A device, according to claim 2, wherein said core is formed with an enlarged head at said one end, said other end extending beyond the other end of said sleeve.

4. A device, according to claim 3, including a washer mounted over the other end of said core and against said other end of said sleeve.

5. A device for delivering a liquid such as water from a source to a site such as a potted plant, comprising
   (a) a valve adapted to be positioned at said site and responsive to the moisture level thereof,
   (b) said valve including a first tubular member formed of a material having a relatively high coefficient of expansion in the presence of moisture and a second member formed of a material that is essentially stable in the presence of moisture,
   (c) said second member extending coaxially through said first member and restrained at one end to one end of said first member, the other end of said second member extending beyond the other end of said first member and being formed with an opening proximate to the other end of said first member and defining a nipping joint between the annular edges of the other end of said first member and the end edges of said opening subject to the relative movement between said members according to the moisture level at said site, and,
   (d) an elongated flexible tube passing through said opening and adapted to be extended between said site and said source.

* * * * *